April 30, 1940.  J. H. WEATHERFORD  2,199,086
COIN AND TICKET RECEPTACLE
Filed March 30, 1939  2 Sheets-Sheet 1
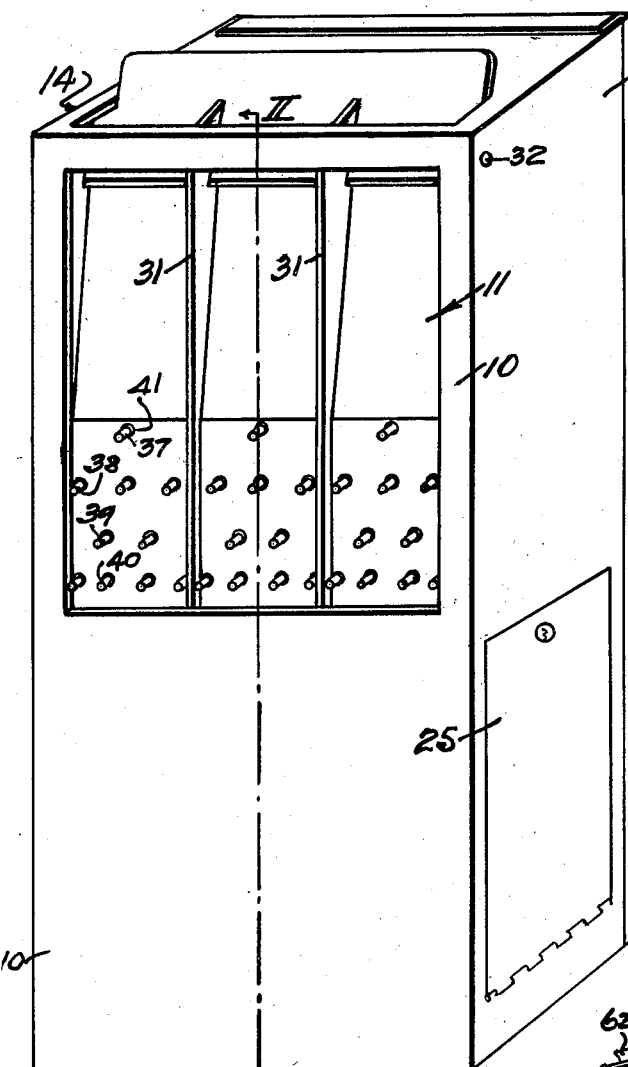
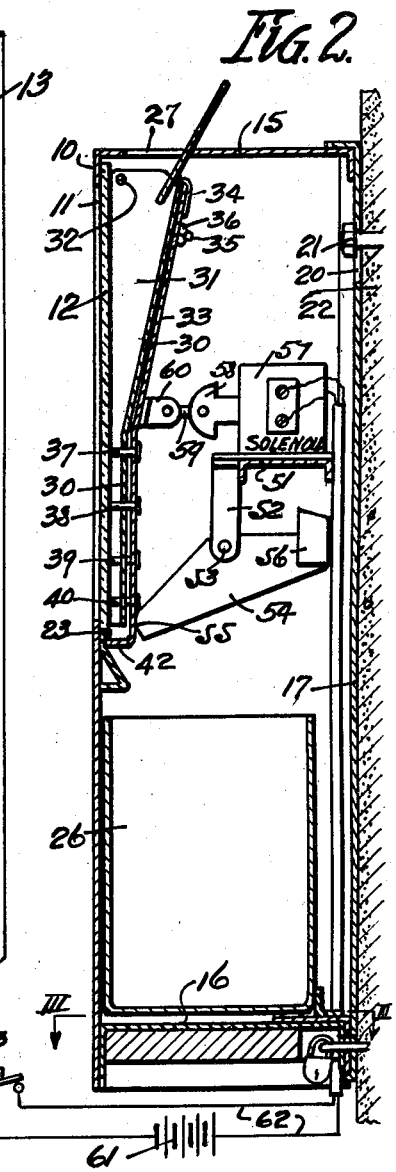
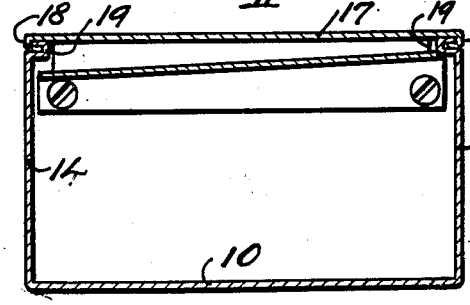
INVENTOR
Joseph H Weatherford April 30, 1940.  J. H. WEATHERFORD  2,199,086
COIN AND TICKET RECEPTACLE
Filed March 30, 1939  2 Sheets-Sheet 2
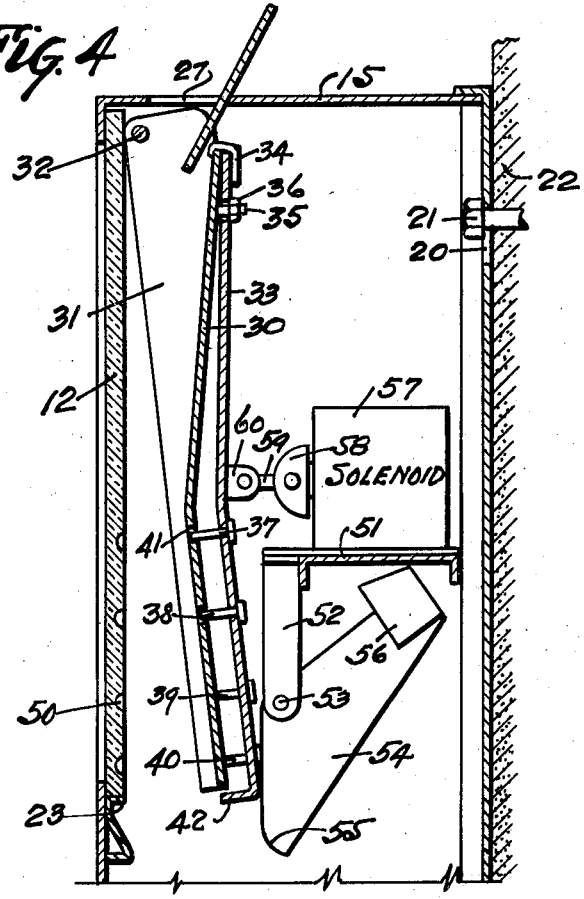
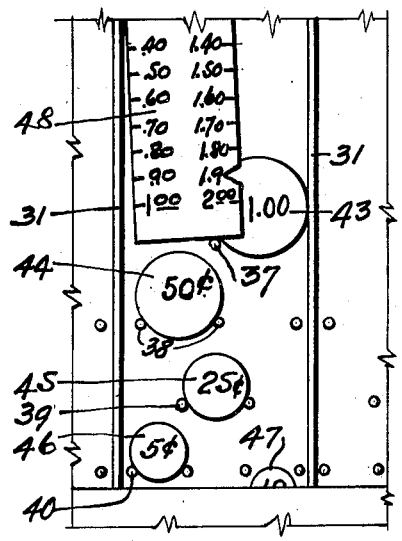
INVENTOR
Joseph H Weatherford Patented Apr. 30, 1940

2,199,086

UNITED STATES PATENT OFFICE 2,199,086

COIN AND TICKET RECEPTACLE

Joseph H. Weatherford, Memphis, Tenn., assignor to Hull-Dobbs Enterprises, Akron, Ohio, a corporation of Ohio Application March 30, 1939, Serial No. 264,913

16 Claims. (Cl. 232—7)

This invention relates to coin and ticket receptacles of that class which are adapted to receive tickets indicating the amount of a charge, and coins or currency deposited in payment of such charge.

It particularly relates to a device of this kind in which a ticket and the money deposited in payment of the charge indicated on such ticket are deposited in a receptacle adapted to receive both thereof, and in which the charge ticket and the coins of various denominations necessary to pay such charge are segregated and displayed in such manner that they may be visible from a more or less remote point.

It further relates to such a device, in which several tickets, each with its related payment money may be separately deposited and each ticket and its related money be separately held and displayed.

It further relates to a device of this kind in which the tickets, coins and currency may be released and when so released will drop into a coin drawer or other receptacle from which they may be subsequently removed by an authorized agent.

In many restaurants it is customary to use a charge ticket with indicia thereon indicating serially, various amounts, these tickets ordinarily being punched to indicate the amount of the charge, and in most cases being deposited by the cashier in a cash register along with the money received, such method presumably insuring that all the monies collected are accounted for.

It has been found however that both amounts received and tickets are sometimes withheld with the result that all the monies collected are not turned over as they should be to the proprietor. This has indicated the advisability of having the customer deposit both the money and the check in a receptacle divorced from the control of the operator and preferably visible to other parties, thus minimizing collusion between the customer and the cashier.

In machines of this kind it is of extreme importance, in order that the cashier may see that the correct amount is deposited in each instance, that the ticket may be visible to the cashier and that the money, usually comprising coins of several denominations, be also spread out and segregated so that it may be seen, and it is further important that in such separation coins be so spread out as to be definitely and easily observable.

Additionally it is of importance that provision be made for separating the tickets and monies of several customers leaving at once, so that the tickets and related money of each may be compared.

It is further necessary that both the tickets and money be definitely and positively released to insure that the machine be cleared, this being particularly advisable with regard to the tickets in order that no tickets remain on display and hide a succeeding ticket.

The objects of the present invention are:

To provide a simple and efficient device which will jointly display both the ticket and the segregated coins in as close proximity as possible in order that definite and ready comparison may be made.

To provide means for definitely separating the coins by sizes so that by their position the value of the various coins may readily be observable; and To provide means whereby a number of deposits may be made before release, by which means each ticket and its coin deposit is segregated from any other ticket and its coin deposit, so that deposit by two or more customers in rapid succession may be definitely segregated and observable without danger of confusion.

It is a further object of the invention to make a device of the character described which is simple, efficient and definite in its indication.

The means by which the foregoing and other objects are accomplished and the method of their accomplishment will readily be understood from the following specification on reference to the accompanying drawings, in which:

Fig. 1 is a perspective view of the complete unit.

Fig. 2 is a vertical, sectional elevation of the unit taken as on the line II—II of Fig. 1.

Fig. 3 is a sectional plan taken as on the line III—III of Fig. 2.

Fig. 4 is an enlarged sectional elevation corresponding to Fig. 2 showing the coin and ticket receptacle in retracted or dumping position; and Fig. 5 is a fragmentary view on the same scale as Fig. 4 showing the manner in which the ticket and coins are segregated in order that they may be readily observed.

Referring now to the drawings in which the various parts are indicated by numerals:

The device comprises a substantially rectangular case, preferably of sheet metal having a front 10 with a window opening 11 therein, which window opening is closed by a sheet of glass 12, and having sides 13 and 14, preferably integral with the front, a top 15 and a bottom 40 and is retained by the flange 42, the coins and the ticket being thus spread out in such manner that the attendant, at a more or less remote point, may readily see and determine that the proper amount has been deposited to meet the charge. Should a second customer deposit a ticket and coins also immediately, or otherwise before the first deposit has been cleared, the second ticket and deposit would be made in an adjacent pocket and this ticket and the coins in payment therefor would likewise be visible. After one or more deposits have been made, the attendant pushes the button 63, which is located for his convenience, actuating the solenoid 57 and causing the plunger 58 and the plates 33 and 30 to be retracted away from the glass front 12, the pull of the solenoid in such case being sufficient to displace the cam 55 and permit such action.

As the plunger 58 of the solenoid is thus retracted the plate 33 is pulled away from the plate 30 within the limit permitted by the bolt and nut 35, 36, the pins 37 to 40 inclusive are retracted clear of the face of the plate 30, and the flange 42 is similarly so retracted, thus leaving an open, unobstructed discharge for both the ticket and the coins within the hopper, allowing these coins and the tickets to drop freely downward into the money box 26 disposed therebelow for their reception.

Should the charge require it, the customer usually folds a dollar bill and deposits it through the opening 27 in lieu of the silver dollar as part of his payment. The withdrawal of the plate 30 by the subsequent action of the solenoid is usually sufficient to permit such folded paper dollar to drop from the pocket. It is true that in certain instances this does not occur, but the dollar does move downward and by allowing the plates to swing forward and subsequently retracting them one or more times no difficulty is found in causing such folded money to be quickly released and drop into the money box.

It will particularly be noted that in this device substantially identical pockets are provided each for the reception of both the money and the related charge ticket, so that even if two or more tickets, together with their respective monies are dropped in rapid succession, each ticket and its related money payment will be properly associated and segregated, so that visual determination may be directly made of the correctness of the deposits in each of the several cases.

It will be noted that the device is simple and compact and the moving and actuating parts free from complication and direct and positive in their actions.

I claim:

1. A device of the character described including a hopper for the joint reception and display of a charge ticket and monies in payment of said charge, said hopper having a transparent, substantially vertically disposed front wall, a complementary rear wall structure adapted to be shifted into spaced proximity to said front wall and away therefrom, and means for accomplishing said shifting, said rear wall structure including means substantially contacting said front wall when said rear wall structure is in proximity thereto, and preventing passage of said ticket, said contacting means being arranged from the top thereof downward, to successively restrict passage of coins of less and less size.

2. A device of the character described including a hopper for the joint reception and display of a charge ticket and monies in payment of said charge, said hopper having side walls, a transparent, substantially vertically disposed front wall, a complementary rear wall structure adapted to be shifted into spaced proximity to said front wall and away therefrom, and means for accomplishing said shifting, said rear wall structure including means substantially contacting said front wall when said rear wall structure is in proximity thereto, and cooperating with said side walls to prevent passage of said ticket, said contacting means being arranged from the top thereof downward, in cooperation with said side walls to successively restrict passage of coins of less and less size.

3. A device of the character described including a hopper for the joint reception and display of a charge ticket and monies in payment for the charge thereon, said hopper having side walls, a transparent, substantially vertically disposed front wall, a complementary rear wall structure adapted to be shifted into spaced proximity to said front wall, and away therefrom, and means for accomplishing said shifting, said rear wall structure carrying a plurality of pins adapted to project into contact with said front wall when said rear wall structure is in proximity thereto, and to move away therefrom with said rear wall, said pins being arranged in horizontal sets of progressively closer spacing from the upper thereof downward, and cooperating with said side walls to stop passage of said ticket, and to successively restrict passage of coins of less and less size.

4. A device of the character described including a transparent, substantially vertically disposed front wall, a complementary rear wall structure adapted to be shifted into spaced proximity to said front wall and away therefrom, and means for accomplishing said shifting, said rear wall structure carrying partitions separating the space between said walls into a plurality of pockets, each adapted to receive and display a charge ticket and monies in payment for the charge thereon, said rear wall also carrying a plurality of means adapted to project into substantial contact with said front wall when said rear wall structure is in proximity thereto, to prevent passage of said tickets, and said contacting means being arranged in downward progression to successively restrict passage of coins of less and less size.

5. A device of the character described including a transparent, substantially vertically disposed front wall, a complementary rear wall structure adapted to be shifted into spaced proximity to said front wall and away therefrom, said rear wall structure carrying partitions separating the space between said walls into a plurality of pockets, each adapted to receive and display a charge ticket and monies in payment for the charge thereon, said rear wall also carrying a plurality of means adapted to project into substantial contact with said front wall when said rear wall structure is in proximity thereto, said means being positioned to prevent passage of said tickets and being arranged in downward progression to successively restrict passage of coins of less and less size, means for holding said rear wall structure forward with said projecting means in front wall contact, and manually controllable means for retracting said rear wall structure to release said coins and tickets.

6. A device of the character described includseparating said complementary means and said wall to clear said hopper.

12. A device of the character described including a hopper for the joint reception and display of a charge ticket and monies in payment of said charge, said hopper including a transparent display wall and means complementary thereto for segregating said ticket and individual units of said monies according to size, and for holding the segregated items in adjacency to said display wall; and manually operable means for shifting said complementary means to clear said hopper.

13. A device of the character described including a hopper for the joint reception and display of a charge ticket and monies in payment of said charge, said hopper including a transparent display wall, a complementary structure cooperating with said wall, said structure including means for segregating said ticket, and individual units of said monies according to size, and means for holding same substantially against said display wall; and manually operable means for shifting said complementary structure to clear said hopper, said structure also including means compelling displacement of said ticket and monies from said segregating means.

14. A device of the character described including a hopper for the joint reception and display of a charge ticket and monies in payment of said charge, said hopper including a transparent display wall, a complementary structure adapted for cooperation with said wall, and manually operable means for shifting said complementary structure into cooperating adjacency with, and away from said wall, to clear said hopper, said structure including means for segregating said ticket, and individual units of said monies according to size, means for holding said ticket and monies substantially adjacent said wall, and means for displacing said ticket and monies from said segregating means on movement of said structure away from said wall.

15. A device of the character described including a hopper for the reception of a charge ticket and monies in payment of said charge, said hopper having side walls, a transparent, substantially vertically disposed front wall and a complementary rear wall structure, said structure including a plate, means at the upper end of said plate hingedly supporting same for swinging movement toward and away from said front wall, the upper end of said plate being spaced rearwardly from said front wall to provide a hopper entrance, and said plate being bent intermediate its height to permit at least the lower half thereof to be swung into substantially parallel adjacency to said front wall, said plate having forward projections substantially contacting said front wall when in proximity thereto, and co-operating with said side walls to prevent passage of said ticket, said contacting means being arranged from the top thereof downward, in cooperation with said side walls to successively restrict passage of coins of less and less size.

16. A device of the character described including a hopper for the joint reception and display of a charge ticket and monies in payment of said charge, said hopper having a transparent, substantially vertically disposed front wall and a complementary rear wall structure adapted to be shifted toward and away from said front wall, said rear wall structure including a plate bent intermediate its height to diverge the upper portion thereof rearwardly with respect to the lower portion thereof, hinge means at the upper end of said plate swingingly supporting said upper end in rearwardly spaced relation to said front wall to provide an enlarged hopper opening, the positioning of said upper end with respect to said front wall being such as to permit the lower portion of said plate to be moved into substantially parallel adjacency with said front wall, means substantially contacting said front wall when said rear wall structure is in proximity thereto, and preventing passage of said ticket, said contacting means being arranged from the top thereof downward, to successively restrict passage of coins of less and less size.

JOSEPH H. WEATHERFORD.